US007197469B2

(12) United States Patent
Hegde et al.

(10) Patent No.: US 7,197,469 B2
(45) Date of Patent: Mar. 27, 2007

(54) METHOD FOR ALLOCATING LIMITED COMPONENT SUPPLY AND CAPACITY TO OPTIMIZE PRODUCTION SCHEDULING

(75) Inventors: Sanjay R. Hegde, Essex Junction, VT (US); Robert John Milne, Jericho, VT (US); Robert A. Orzell, Essex Junction, VT (US); Mahesh Chandra Pati, South Glastonbury, CT (US); Shivakumar P. Patil, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 1194 days.

(21) Appl. No.: 09/891,850

(22) Filed: Jun. 26, 2001

(65) Prior Publication Data

US 2002/0198757 A1 Dec. 26, 2002

(51) Int. Cl.
*G06F 9/46* (2006.01)
(52) U.S. Cl. ........................................................ 705/8
(58) Field of Classification Search .................... 705/7, 705/8; 700/97–100
See application file for complete search history.

(56) References Cited

U.S. PATENT DOCUMENTS

| | | | |
|---|---|---|---|
| 4,015,366 A * | 4/1977 | Hall, III ...................... 47/1.43 |
| 5,235,508 A | 8/1993 | Lirov et al. | |
| 5,548,518 A * | 8/1996 | Dietrich et al. ............. 700/100 |
| 5,630,070 A | 5/1997 | Dietrich et al. | |
| 5,787,000 A | 7/1998 | Lilly et al. | |
| 5,943,484 A | 8/1999 | Milne et al. | |
| 5,971,585 A | 10/1999 | Dangat et al. | |
| 6,031,984 A | 2/2000 | Walser | |
| 6,041,267 A | 3/2000 | Dangat et al. | |
| 6,049,742 A | 4/2000 | Milne et al. | |
| 6,571,215 B1 * | 5/2003 | Mahapatro ...................... 705/8 |
| 6,606,527 B2 * | 8/2003 | de Andrade et al. ........... 700/97 |
| 6,941,514 B2 * | 9/2005 | Bradford ..................... 715/700 |

FOREIGN PATENT DOCUMENTS

WO WO9713211 * 4/1997

OTHER PUBLICATIONS

Larry "Supply Chain Planning Optimization Just the Facts"; May 1998; The Report on Supply Chain Management; pp. 3-40.*

(Continued)

*Primary Examiner*—Romain Jeanty
(74) *Attorney, Agent, or Firm*—Richard M. Kotulak; Greenblum & Bernstein P. L. C.

(57) ABSTRACT

A method and system for resource rationing which employs decision rules for the optimal allocation of supply and capacity over time that satisfy two key requirements (a) being consistent with accepted operational objectives (e.g. low inventory, short lead times, prioritized allocation of supply and capacity) and (b) allowing for the timely computation of a feasible production schedule. The method and system is generally characterized in that it is able to divide each of the priority ranked scheduled releases (Material Requirements Planning (MRP)) into "N" separate and smaller sized scheduled releases where the priority of each of the "N" releases may be equal to the priority of the original release. The "N" separate and smaller sized scheduled releases are sorted according to priority and then used to determine an optimal supply schedule for allocating resources including component supply and assembly capacity.

23 Claims, 9 Drawing Sheets

OTHER PUBLICATIONS

Cheng et al "Production Scheduling of Continuous Flow Lines: Multiple Products With Setup Times and costs", Dec. 1998, Production and Operation Management, vol. 7, No. 4.*

Faaland et al "Scheduling Tasks With Due Dates in a Fabrication/Assembly Process", May 1998, University of Washington, Seattle, Washington, pp. 378-383.*

Orlicky, J., "Material Requirements Planning", 1993, McGraw Hill.

Hopp, W. J., and Spearman, M.L., "Factory Physics Foundations of Manufacturing Management", 1996, Irwin, Chicago, 135-141.

Leachman, R.C., Benson, R.F., Liu, C., and Raar, D.F., 1996, "IMPRESS: An Automated Production-Planning and Delivery-Quotation System at Harris Corporation—Semiconductor Sector", Interfaces, 26, 1, 62-64.

Sullivan, G., and Fordyce, K., 1990, "IBM Burlington's Logistics Management System", Interfaces, 20, 1, 43-64.

* cited by examiner

METHOD FOR ALLOCATING LIMITED COMPONENT SUPPLY AND CAPACITY TO OPTIMIZE PRODUCTION SCHEDULING

CROSS REFERENCE TO RELATED APPLICATION

This application is related in subject matter to U.S. patent application Ser. No. 09/891,554, now U.S. Pat. No. 6,584,370, filed concurrently herewith by Sanjay R Hegde, Robert A. Orzell and Brian Denton for "Method of Calculating Low Level Codes For Considering Capacities", which is incorporated herein by reference.

DESCRIPTION

BACKGROUND OF THE INVENTION

1. Field of the Invention

The present invention generally relates to computer implementable decision support systems for determining a production schedule of feasible material releases within a complex multi-stage manufacturing system architecture. In more particularity, the present invention relates to a system for rationing manufacturing resources among competing demands according to a defined set of business rules.

2. Background Description

The manufacturing of semiconductors is a complex and refined process. This process includes everything from growing silicon crystals, to the actual placement and soldering of chips to a printed circuit board. Initially, raw wafers are cut from a silicon ingot and processed through a specific sequence of work centers. The end goal of this process is to build a set of integrated circuits on the surface of the silicon wafer according to a specific circuit design. This process involves repeatedly applying four basic steps: deposition, photolithography, etching, and ion implantation. These steps are the means by which materials with specific dielectric properties (e.g., conductors, insulators) are deposited on the surface of the wafer according to the precise circuit design specifications. These steps are repeated many times to build up several layers (typically between 12 and 25 layers) of the circuits.

After the circuits have been built on the wafers they are tested to determine the resultant yield of operational circuits and tagged for later reference. The circuits are then diced and sorted, and subsequently wire bonded to a substrate to assemble a module. These modules, which are further tested to determine electromagnetic and thermal characteristics, are eventually combined on printed circuit boards to form cards. Finally, the cards are tested and those that pass are eventually used in the assembly of a wide range of finished electronic products (e.g., personal computers, printers, CD players, etc.). From the point of view of semiconductor manufacturing, the modules and cards are, mostly, the finished products taken to market.

Figure 1:
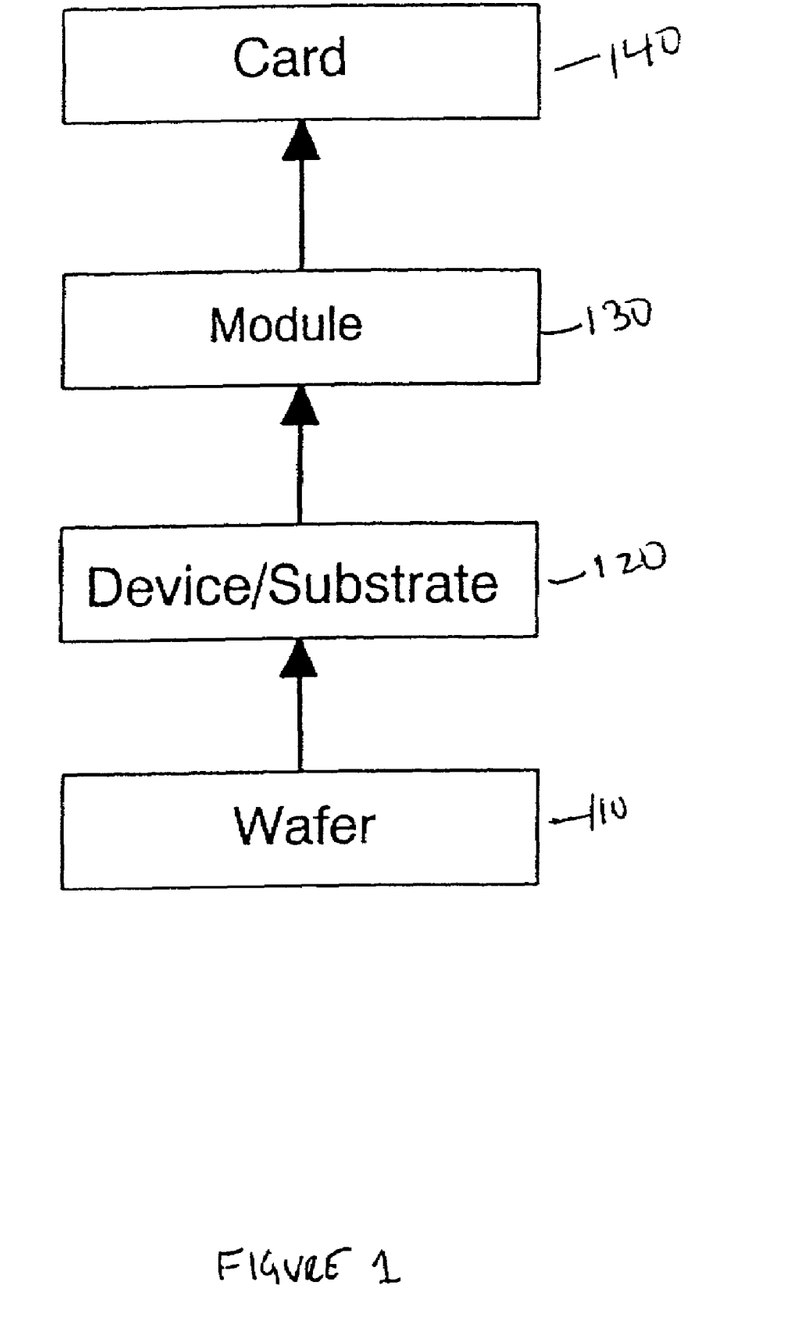
FIG. 1 is a high level block diagram showing steps for semiconductor manufacturing.

To assemble the modules and cards (or other end products), a Bill of Material (BOM) is needed to specify the required components used in the assembly of each particular part number (PN) produced within the manufacturing system. The BOM can be used to generate a graphical representation of the stages within a manufacturing process for each of the finished products. For example, FIG. 1 shows a high level block diagram of the BOM for semiconductor manufacturing which can be broken into the following four aggregate stages: wafer stage 110, device/substrate stage 120, module stage 130, and card stage 140. These aggregate stages may involve many steps each of which may significantly impact the flow of materials through the manufacturing system. For example, the wafer stage 110 may involve wafer fabrication involving many passes through photolithography work centers to build multiple levels of a circuit structure. The dicing of the silicon wafer stage 120 involves a single item in the production process which is then converted into different devices. Also, the card stage 140 may involve the assembly of many devices to generate a single card. These stages result in multiple qualities of items being output from various stages of the manufacturing system according to a known distribution.

In addition to the BOM, other sources of manufacturing information such as yields, cycle times, shipping routes, etc. are critical for advance planning and scheduling of the product. However, a fundamental problem faced in all manufacturing industries is the matching of demand and assets over a set time period. By way of example, production lead times necessitate the advance planning of production so that material releases throughout the production system are coordinated with the end customers demand for any of a wide range of finished products (typically on the order of thousands in semiconductor manufacturing). Such advance planning depends on the availability of finite resources which include, for example, finished goods inventory, work in process (WIP) at various stages of the manufacturing system, and work center capacity. Furthermore, there may be multiple locations, processes, and work centers that may be utilized for a particular job.

As is known, product advance planning decisions are necessary due to the complicated process architecture and unavoidably long lead times to complete processing through all manufacturing stages for a finished product. For this reason and to accommodate the planning and scheduling functions within the semiconductor manufacturing industry, a tiered planning system was devised. The following is a summary based on the tier system devised by Sullivan, G. and Fordyce, K., 1990, "IBM Burlington's Logistics Management System", Interfaces, 20, 1, 43–64. In this tiered system each tier is defined by the time frame to which the decisions pertains.

Tier 1: Long range (3 months to 7 yr) strategic level decisions such as mergers, capacity acquisition, major process changes, new product development, and long term policy based decisions.

Tier 2: Medium range (1 week to 6 months) tactical scheduling involving yield and cycle time estimation, forecasting and demand management, material release planning and maintenance scheduling.

Tier 3: Short to medium range (weekly planning) operational scheduling for optimizing consumption and allocation of resources and output of product, demand prioritization techniques, capacity reservation and inventory replenishment.

Tier 4: Short range (daily) dispatch scheduling for addressing issues such as machine setups, lot expiration, prioritizing of late lots, job sequencing, absorbing unplanned maintenance requirements and assigning personnel to machines.

The above taxonomy of planning and scheduling decisions is a hierarchical one, i.e., decisions in higher tiers affect lower tiers. For example, long range capacity acquisition decisions determine eventual yield and cycle times, the available resources that can be utilized, and the extent to which maintenance is to be scheduled in the future. As is known, decisions in higher tiers, by the nature of their long time frames, are made under considerable uncertainty and thus seek to anticipate future requirements based on current information. On the other hand, lower level tier decisions are of a corrective/ reactive nature and act to absorb uncertainty not accounted for in the higher tiers. It is also noted that advanced production planning and scheduling decision support systems are typically run on a weekly basis; however, the planning horizon for such runs may range several years depending on the planning horizon of interest and the level of detail in forecasting. Thus, advance planning systems may impact decisions in tiers 1, 2 and 3 which, in turn, may affect tier 4 decisions. Therefore, the matching of assets to demand is a major planning activity which affects decisions within all tiers.

It is noted that if unlimited assets were available then the matching of demand with assets would be straightforward. In reality, however, finite supply and capacity create constraints on production scheduling. These constraints make the determination of a feasible production schedule (let alone an optimal one) a complex problem. The production scheduling, which includes major activities involved in the production planning process, can be divided into three categories: Supply Aggregation (SA), Materials Requirements Panning (MRP) and Resource Allocation (RA).

Supply Aggregation (SA)

The Supply Aggregation involves capturing and transforming micro/factory floor details into a manageable data set. For example, WIP at a particular work center in the manufacturing system may ultimately travel through a variety of different routings. These routings depend on which type of finished product is eventually produced by the WIP. However, at any given point in the system a set of operations can be isolated which are common to all potential routings that the WIP can travel through from that point forward. In other words, a limited set of the immediate future operations required for the WIP are known.

The purpose of the Supply Aggregation step is then to project the WIP forward through the required work centers to points at which decisions regarding alternative routings are necessary. As the WIP is moved forward, its amount is adjusted for yield losses at the work centers through which it has traveled. Furthermore, the time at which the WIP becomes available at the projected work center is computed based on known cycle times at each work center. In reality, these times occur over a continuum; however, in practice, these times are discretized into a finite set of time periods. The end result of the Supply Aggregation is then to significantly reduce the number of material release points considered in future calculations which, in turn, decreases computation time to compute a feasible production schedule.

Material Requirements Planning (MRP)

Material Requirements Planning is a well known production scheduling method based on "explosion" of finished product demand using manufacturing information such as the BOM, yield and cycle times, inventory and planned receipts. The MRP is based on taking demand for finished product and sequentially moving backwards through the BOM (exploding). Required material releases are determined as well as the ideal release date based on cycle times at each work center at each level of the BOM.

Specialized process dependent factors in semiconductor manufacturing introduce additional complexities beyond those that can be readily handled by basic MRP. These additional complexities may result from material substitution or binning, both of which must be accounted for in computing production schedules. For example, at certain stages of the manufacturing process there is the opportunity for material substitution in which higher quality items are substituted for lower quality items (e.g., 900 MHz processor substituted in place of a 700 MHz processor). Another important process specific to semiconductor manufacturing is binning which refers to a distribution of quality levels for circuits built on a silicon wafer. The effect of binning is to link decisions about material releases among multiple PNs within the BOM which subsequently requires the use of large scale optimization methods, typically linear programming (LP) based models. The production scheduling system which incorporates LP in generating material releases to account for binning and material substitutions is referred to as Advanced Material Requirements Planning (AMRP). See, U.S. Pat. No. 5,943,484, which is incorporated herein by reference in the entirety.

Resource Allocation (RA)

MRP generates a set of ideal material releases under the assumption that unlimited resources are available. The purpose of Resource Allocation is then to systematically adjust this ideal set of releases to make them feasible with respect to constraints due to limited resources. That is, RA is concerned with the allocation of limited capacity to generate a feasible production schedule.

Historically a broader group of methodologies, referred to as extended MRP or MRP II, have included steps in which capacity requirements are evaluated based on releases generated by MRP. A method called "Best Can Do" (BCD) (see, U.S. Pat. No. 5, 971,585), which uses linear programming, extends the capability of MRP II based systems from analysis to the actual development of a near optimal production schedule. This involves moving up from lower to higher levels of the BOM (implosion) and allocating resources sequentially at each level based on a priority ranking of the MRP material releases (which are, in turn, determined by priority ranking of orders they support). The resources allocated, using these systems, can be separated into two groups, supply and capacity. The fundamental difference between these two types of assets (groups) is that unapplied supply is available to apply at a later period; whereas, unapplied capacity is not available to apply at a later period. When supply and/or capacity constraints are violated by the MRP releases, the schedule of releases is adjusted in time by moving a portion of the release to an earlier period if possible and otherwise a sufficiently later period in time such that the required supply and capacity are available.

Plans generated using MRP are often referred to as ideal plans since they are uncapacitated (they assume unlimited supply and capacity). With this said, various rough-cut capacity planning methods have been documented in the literature ("Factory Physics: Foundations of Manufacturing Management", Hopp, W. J., Spearman M. L., 1996, Irwin, Chicago). The nature of these methods is to determine when capacity constraints are violated rather than how to generate a feasible schedule. Detailed capacitated material release scheduling has been less explored.

Methods for achieving detailed capacitated material releases can be broadly separated into optimization based methods and heuristics. Yield losses, material substitution, and binning are examples of processes which force the use of new and specialized methods for RA typically involving the use of LP models.

A critical weakness of the priority ranking based heuristics upon which the above logic is based is the inadequacy to account for ties in ranking when rationing of resources is necessary. This is a fundamental problem faced in many industries. As mentioned, BCD relies heavily on LP based models, and rationing of resources is something which cannot be captured in LP models because it violates the underlying axioms. (LP models, by assumption, have linear objective functions and linear constraints.) As is known, LP used in BCD is formulated as a cost minimization problem where the objective function is comprised of costs for processing, shipping, back ordering, inventory holding, and material substitution, as well as negative revenues, all of which are linear in their respective decision variables. Logically, material releases of equal priority have equal cost penalties and revenues associated with rationing resources under such conditions. As a result, the allocation of resources to a particular material release can be an "all" or "nothing" scenario. This occurs because LP models exhibit degeneracy when there are multiple allocation options, i.e., multiple solutions with the same objective function value.

As a result of the above shortcomings, more complex nonlinear optimization models, or heuristics based on decision rules, are necessary to implement fair sharing of resources. The former possibility, although theoretically possible, has associated practical problems. That is, the complex nonlinear optimization models require implementing algorithms with running times significantly greater than those of LP algorithms. Thus, as of yet and in the foreseeable future, the complex models are infeasible for solving large-scale production scheduling problems in the semiconductor manufacturing industry and other industries with similarly complex manufacturing system architectures.

SUMMARY OF THE INVENTION

It is therefore an object of the present invention to provide a methodology for efficiently rationing supply and capacity across multiple facilities, processes and work centers according to defined rules for rationing resources among competing material releases.

It is another object of the present invention to limit misallocation of supply by accounting for global scheduling information about supply and capacity constraints at a given level of the Bill of Material (BOM) that limits releases at a next level.

It is a further object of the present invention to provide for enhancements to existing planning and scheduling activities so as to be achievable in a timely fashion to make feasible its implementation in a complex manufacturing environment (e.g., semiconductor manufacturing.)

In one aspect of the present invention, a method for optimizing a supply schedule has the steps of dividing a priority ranked release schedule into "N" separate release schedules, where "N" represents a number of divisions of the priority ranked release schedule. The method further includes the step of sorting the "N" separate release schedules in a priority order based on an original priority ordering of the priority ranked release schedule, and allocating available component supply based on the priority in the "N" separate release schedules. The allocating step optimizes a supply schedule of material releases of product by rationing of the available component supply in each of the "N" separate release schedules.

In another aspect of the present invention, the method of optimizing a supply schedule has the steps of dividing each of a priority ranked scheduled release into "N" separate and smaller sized schedule releases, where the priority of each of the "N" schedule releases is equal to a priority of an original release of the priority ranked scheduled release. The method further includes sorting the "N" separate and smaller sized schedule releases based on the original priority ordering and an additional level of priority ordering such that subsequent resource allocation is consistent with rationing of resources.

Then, the method of the present invention allocates the resources including assembly capacities and component supplies to satisfy a scheduled release associated with the "N" separate and smaller sized schedule releases such that the assembly capacities and component supplies are rationed to maximize an output of product in accordance with the priority ranked scheduled release.

In yet another aspect of the present invention a system is provided for optimizing a supply schedule. The system includes a mechanism for dividing each of a priority ranked scheduled release into "N" separate and smaller sized schedule releases, where the priority of each of the "N" schedule releases is equal to a priority of an original release of the priority ranked scheduled release. The system further includes a mechanism for sorting the "N" separate and smaller sized schedule releases based on the original priority ordering and an additional level of priority ordering such that subsequent resource allocation is consistent with rationing of resources. Also, a mechanism is provided for allocating the resources including assembly capacities and component supplies to satisfy a scheduled release associated with the "N" separate and smaller sized schedule releases such that the assembly capacities and component supplies are rationed to maximize an output of product in accordance with the priority ranked scheduled release.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 7:
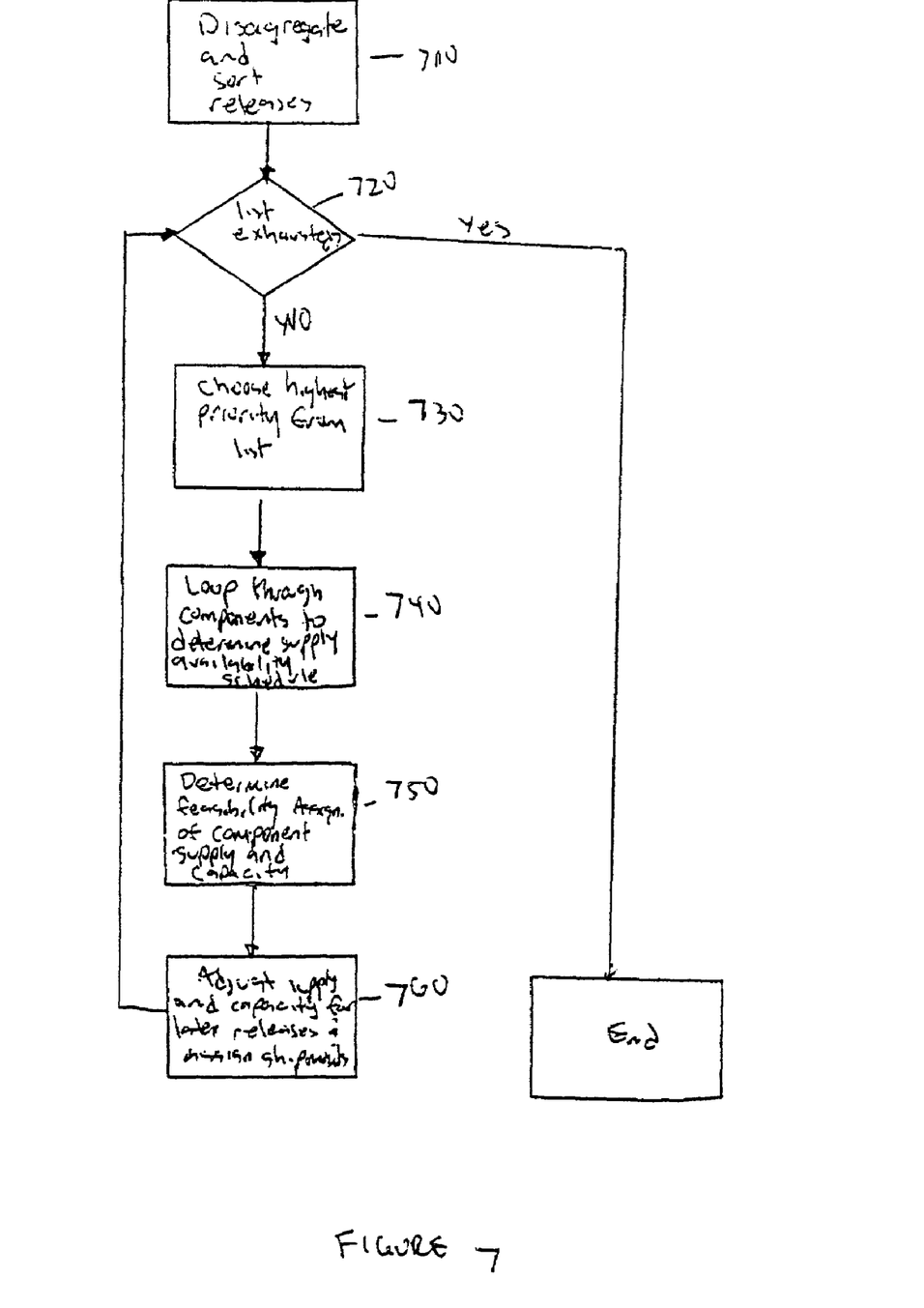
FIG. 7 shows a flowchart implementing the steps of the present invention.
Figure 8:
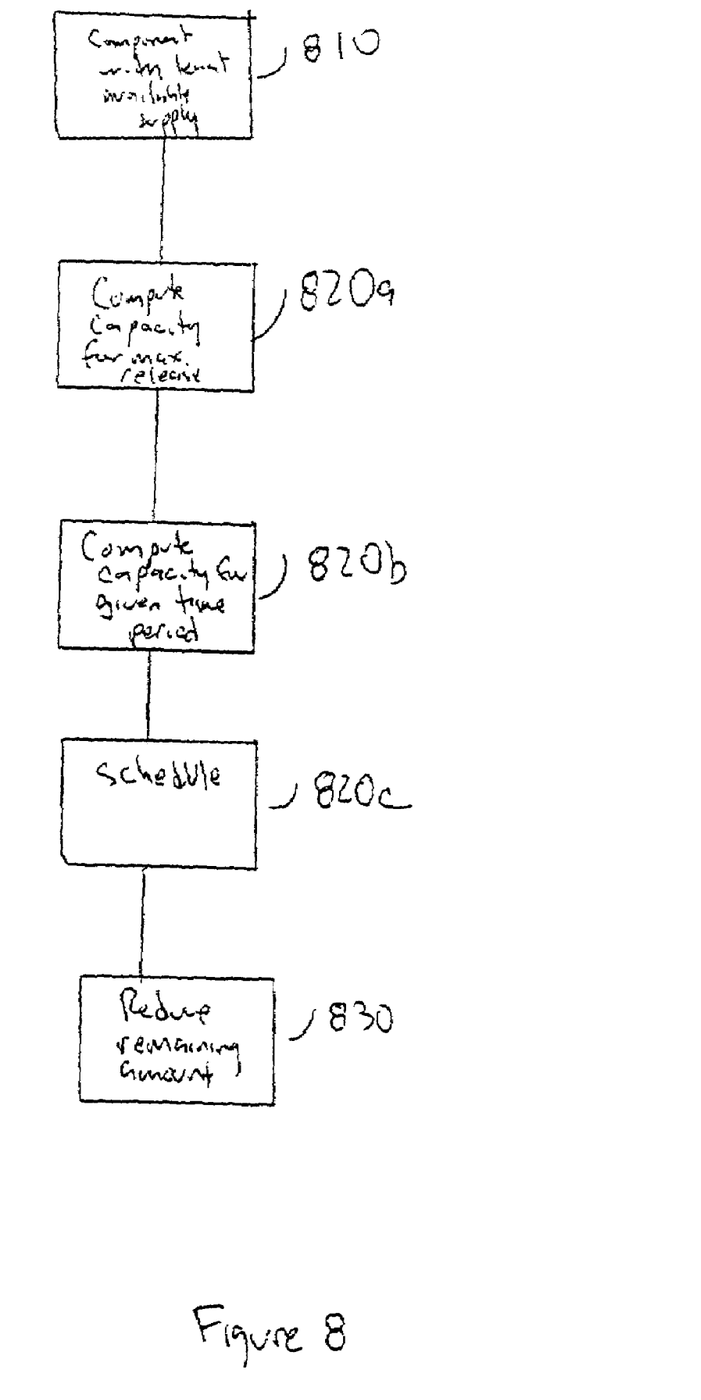
FIG. 8 shows a flowchart implementing sub-steps of step 750 of FIG. 7.

The present invention is directed to a computer implemented decision support system which serves as a solver to determine an appropriate match between existing assets and demands. This allows for the most efficient planning and manufacturing of items such as, for example, semiconductors and the like. To accomplish this task, in embodiments, the present invention maximizes the match between assets and demands at certain specified levels of the Bill of Materials (BOM). This is based on the understanding that the plan for matching assets and demands is in the form of a production schedule of material releases at all levels of the BOM. By way of example, the present invention is capable of determining efficient allocation of capacity and component supply to determine material releases of modules (assemblies) that are consistent with specific rules for rationing scarce supply of devices and substrates (e.g., components), as well as production or assembly capacity. To accomplish the advantages of the present invention, the information input into the present invention may include, for example, a schedule of available supply and capacity, a list of material releases (e.g., ranked by demand class, due date, etc.), transit times for inter-plant shipping, capacity requirements and the like. The present invention will use this information to generate a feasible schedule of material releases and shipments by Part Number (PN), plant location, and process. The present invention, as it is implemented within the existing production scheduling system, can be summarized in the following steps. FIGS. 7 and 8 show a control of the present invention.

Step 1: Divide each of the priority ranked Material Requirements Planning (MRP) scheduled releases into "N" (where "N" is an integer) separate and smaller sized scheduled releases where the original priority of each of the "N" releases may be equal to the priority of the original release. The "N" separate and smaller sized scheduled releases are preferably used throughout the present invention.

Step 2: Sort the releases in the "N" separate and smaller sized releases, based on a combination of their original priority ordering and an additional level of priority ordering such that subsequent resource (e.g., component supply and assembly capacity) allocation should be consistent with rationing of resources. This step may be performed dynamically and may also involve modifying the sorting of the releases in the "N" separate and smaller sized releases using a rule that combines the original priority ranking as well as the finer granularity introduced in Step 1.

Step 3: For each release, allocate assembly capacities and component supplies to satisfy the release (of the finished product) subject to the following conditions:
  (i) Capacity and component supply constraints are not violated.
  (ii) Releases at the given level are restricted to the maximum possible release at the next level given supply and capacity constraints.
  (iii) Limited resources are allocated to equal priority material releases approximately in proportion to their size.

As way of further explanation, Step 1 may involve resolving the original priority ranked list of material releases to a finer granularity. The computational performance of the present invention is controlled depending on the extent of divisions "N" because it involves examination of additional releases at the specific level of the BOM being considered. In embodiments, the present invention embodies the following capabilities:

1. Refinement of material release priorities at selected levels of the BOM to induce rationing of resources within a comprehensive planning and scheduling system for semiconductor manufacturing according to specified business rules.
2. Generation of a production schedule consistent with supply and capacity rationing based on user supplied resource tables in a manner readily embodied within general production scheduling systems.
3. General applicability to planning and scheduling systems using multiple types of solution methods based on optimization algorithms and heuristics.

In embodiments, it is noted that Step 3 may also involve the allocation of component supply and assembly capacity according to availability determined by user supplied input such as transit/shipping times, capacity requirements and capacity availability from current locations. In embodiments, in Step 3, an attempt is first made to allocate supply at the specified assembly release date subject to constraints on the maximum possible release due to supply availability across all components. If insufficient supply is available, the supply is then rationed in proportion to release size, and the difference is made up from supply from earlier periods, if possible, and later periods, if necessary. Next, it may be determined whether sufficient capacity exists to support the modified revised releases and, if not, the remaining capacity requirement is filled using capacity from later periods. The present invention thus allows for computation of a production schedule with feasible allocation of supply and capacity in such a way that rationing, dictated by specified business rules, of both types of resources (assembly capacity and component supply) is optimized in the release schedule.

The present invention described herein has special applicability to semiconductor manufacturing, but is also generalizable to resource rationing problems found in other manufacturing or distribution industries. In operation, the present invention is capable of operating at a specifically chosen set of levels of the BOM during the Resource Allocation computation, and utilizes new decision rules for allocating resources between levels of the BOM in a manner consistent with business rules for resource rationing (described below). These decision rules are implementable within traditional production planning methodologies such as those described above (i.e., MRP explosion followed by RA implosion) as well as additional complexities of semiconductor manufacturing scheduling systems due to yield losses, material substitutions and binning.

Accordingly, the present invention is capable of promoting the rationing of resources among material releases between specified levels of the BOM for the generation of a feasible production schedule in such a way that the resources are allocated in a manner consistent with specifically defined and commonly accepted business rules. At the present time, the decision support system that comprises the present invention has been implemented on a IBM SP2 machine with AFS for data storage. The SP2 is a collection of IBM RISC 6000 systems running under a common AIX operating system. The complete production planning and scheduling system is preferably programmed in C/C++ and uses commercial LP solvers. It should be understood by those of ordinary skill in the art, however, that the present invention is not limited to the above implementation and is independent of the computer/system architecture. It is thus understood that the present invention may equally be implemented on other computing platforms, programming languages and operating systems.

Figure 2:
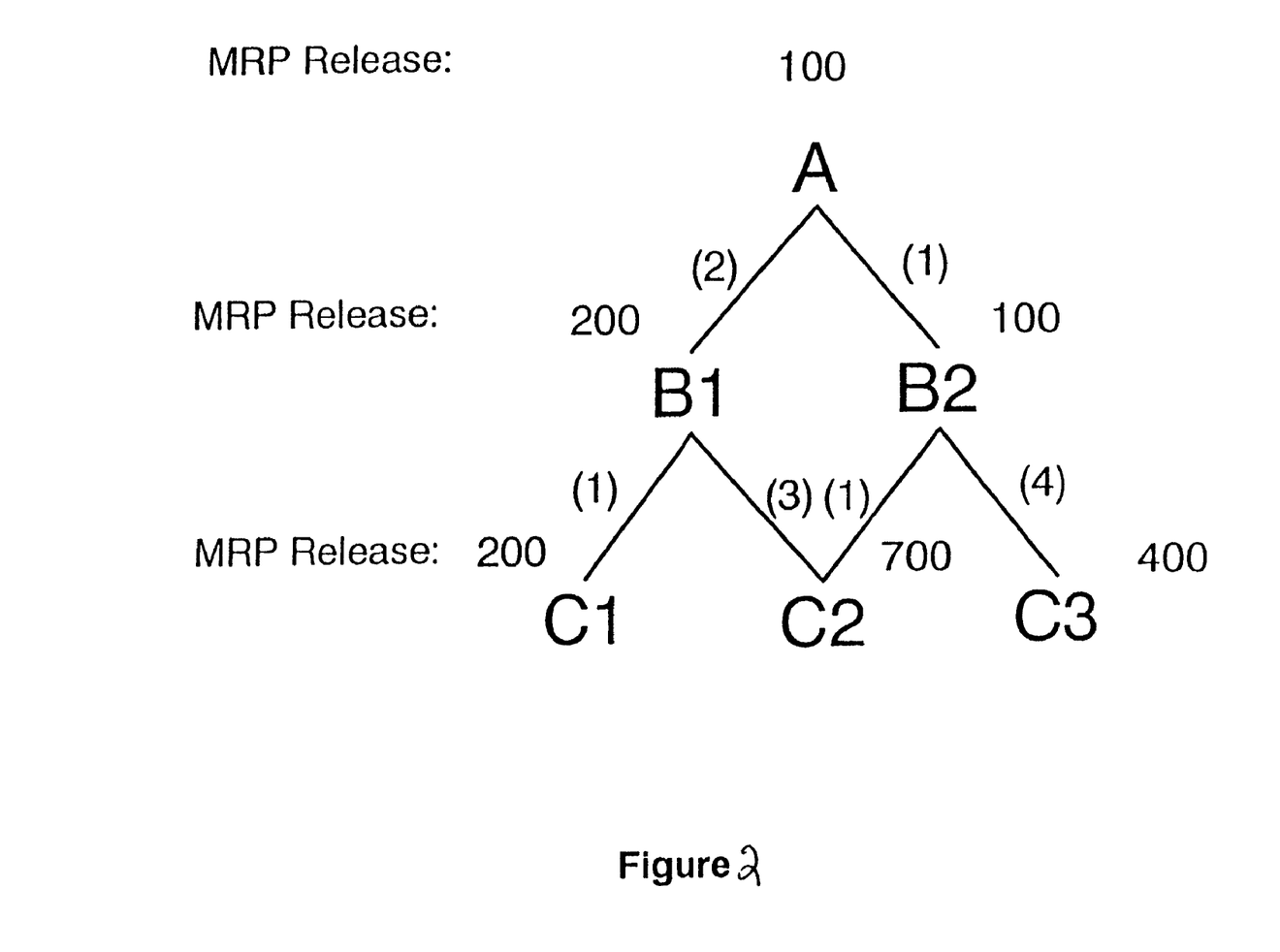
FIG. 2 shows an example of a three level Bill of Material (BOM) tree used for supporting material releases within a manufacturing system.

Referring now to the drawings, FIG. 2 shows an example of a three level BOM tree used for supporting material releases within a manufacturing system. The example in FIG. 2 may represent a simplification of the MRP process in semiconductor manufacturing. To begin, FIG. 2 illustrates the effect of demand for some finished product "A" on the next level of MRP releases for components of "A". In FIG. 2, product "A" is assembled from subassemblies "B1" and "B2" in the ratios 1:2 and 1:1, respectively. As seen in FIG. 2, demand for "A" induces requirements for a material release of 200 units of "B1" and 100 units of "B2". These MRP releases, in turn, induce requirements for MRP releases of components of "B1" and "B2" (i.e., "C1", "C2" and "C3"). This example illustrates the determination of material release quantities based on demand for finished products.

However, another feature of MRP is the determination of release dates. This is performed by using manufacturing times for each level of the BOM to work backwards from the finished product delivery date. For example, releases for "C1", "C2" and "C3" must be scheduled three weeks in advance of the delivery date for "A" if one week is required to assemble "A" and two weeks to assemble each of "B1" and "B2". Together the material release sizes and timing comprise the production schedule.

Figure 3:
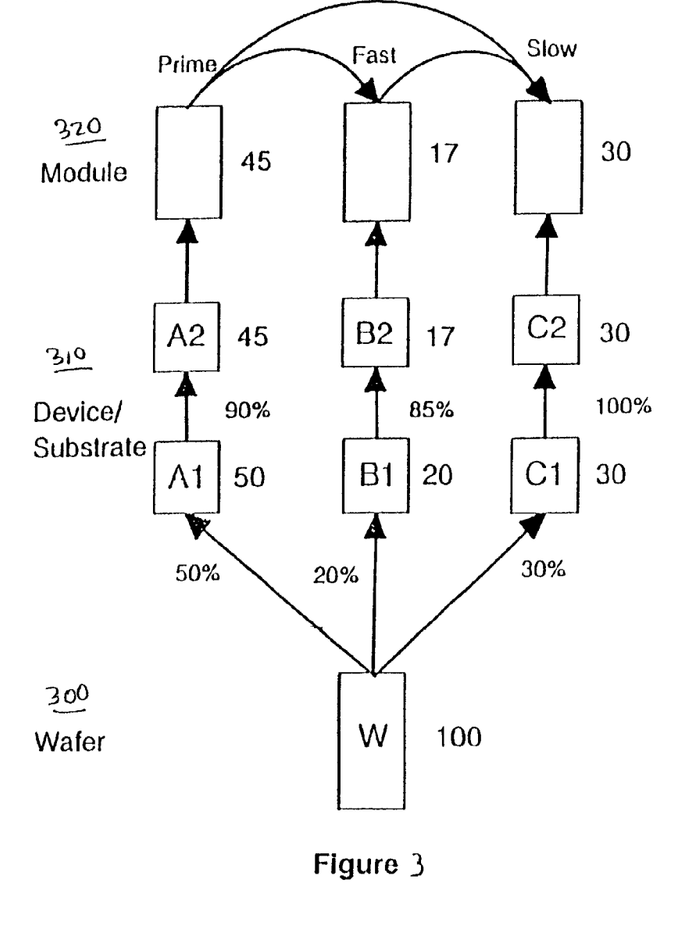
FIG. 3 shows manufacturing information with a high level example of binning and substitution of the module, device and wafer stages of FIG. 1.

In addition to the BOM and cycle times between levels of the BOM, other manufacturing information should be considered such as yield, permissible material substitutions and binning. FIG. 3 illustrates these other manufacturing information with a high level example of the module, device and wafer stages. First, the wafer stage 300 represented by "W" yields a distribution of devices "A1", "B1", "C1" in the proportions 50%, 20% and 30%, respectively. In the example of FIG. 3, wafer "W" yields 100 chips. Accordingly, the yield is 50 of "A1", 20 of "B1", and 30 of "C1". Next, within the device/substrate stage 310 there are device dependent yield losses. For example, in going from "A1" to "A2" there is a 10% loss (i.e., 90% yield). Similarly, going from "B1" to "B2" there is a 15% loss, and going from "C1" to "C2" there is no loss.

Still referring to FIG. 3, devices are incorporated into modules in the module stage 320. In this stage, there is the opportunity to substitute higher quality (faster) devices for lower quality (slower) devices. For example, "Prime" can substitute for either "Fast" or "Slow". Similarly, "Fast" can substitute for "Slow" (but not vice versa). These additional features of semiconductor manufacturing are considerations in determining material releases which typically must be solved using AMRP (advanced MRP using LP models). Furthermore, the possibility of material substitution results in a linking of the LP models for multiple PNs within the BOM since material releases of a particular item depend on the decision about which PN to use.

Now, there are two business rules for rationing of resources for material releases, "Fair Share" and "Square Set". "Fair Share" involves situations where supply and capacity shortages occur. In such situations it is desirable to share the limited resources which cause the shortage among manufacturing releases of equal priority. As referred herein, the term "fair" is defined as: if limited resources are available for manufacturing releases of a particular priority, i.e., there is an insufficient quantity of the resource to allow for each release to receive 100% of its requirement, then each release receives an equal percentage based on its original order size.

Figure 4:
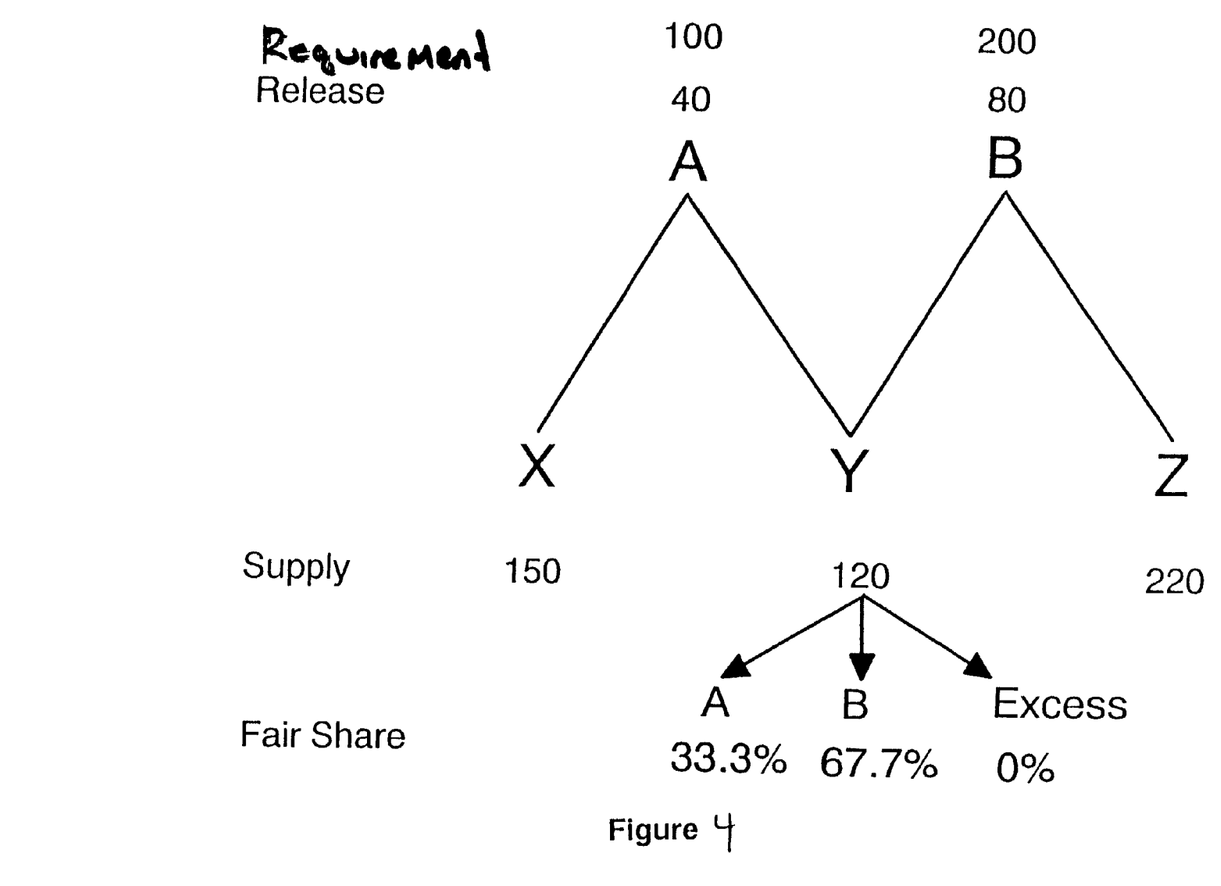
FIG. 4 shows an example of using "Fair Share" business rules which may be implemented with the present invention.

FIG. 4 shows an example of implementing Fair Share business rules. In FIG. 4, a supply constraint limits the release of "A" and "B" to 120 units in total, for example. (Note that there is an excess supply of "X" and "Z".) Thus, based on the fair share rule, and the fact that the requirement for "A" is 100 and for "B" is 200, the available supply would be split in the following manner: "A" receives 1/3 (i.e. 100/(100+200)) and "B" receives 2/3 of the supply. In this example, the release of "A" is 40 units and the release of "B" is 80 units and thus the supply of shared resource "Y" is completely exhausted. Note that the same rules are applicable to rationing capacity as well as supply.

Figure 5:
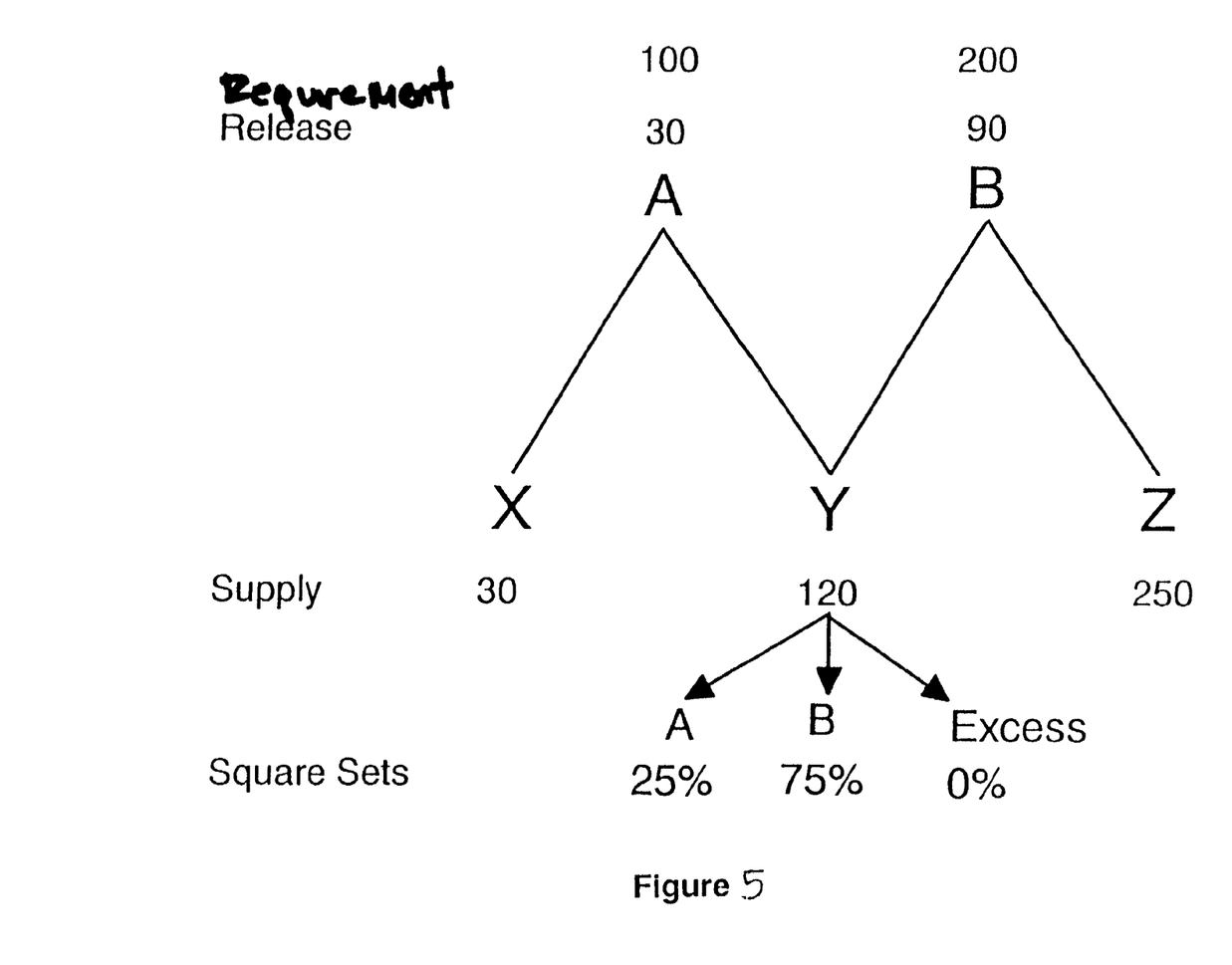
FIG. 5 shows an example using "Square Sets" business rules which may be implemented with the present invention.

FIG. 5 shows an example of implementing "Square Sets" business rules. The concept of square sets refers to the fact that global bottlenecks on production are taken into account when generating a production schedule so that unnecessary releases are avoided and supply can be allocated to other required material releases. FIG. 5 shows a bottleneck on the release of "A". By way of explanation, "A" is made from one unit of each of component "X" and "Y", and "B" is made from one unit each of component "Y" and "Z". FIG. 5 also assumes that there should be a release of 100 units of "A" and 200 units of "B", and that there are quantities of 30, 120 and 250 components of "X", "Y", and "Z", respectively. In this situation, it is optimal to release only 30 units of "A" since the availability of "X" imposes a bottleneck on release of "A". Thus, there is additional supply which can be reallocated to "B".

Figure 6:
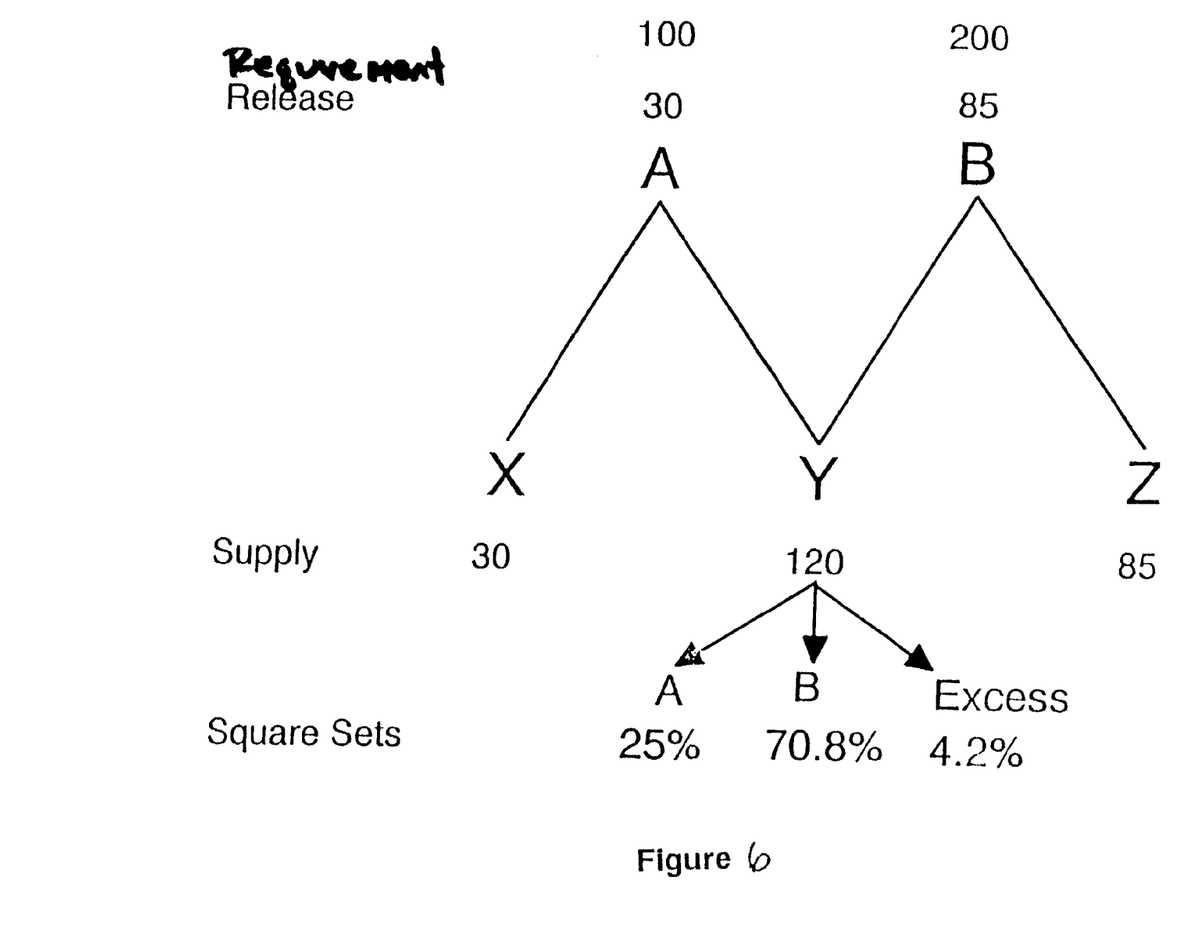
FIG. 6 shows an example using both Faire Share and Square Sets business rules.

FIG. 6 shows an example using both Faire Share and Square Sets business rules. In this example, finished products "A" and "B" are assembled from components "X", "Y" and "Z" and releases are scheduled for 100 units of "A" and 200 units of "B". Component "Y", common to both "A" and "B", has limited supply of 120 units. Component "X" has a supply of 30 units and component "Z" has a supply of 85 units. As thus illustrated, there is insufficient supply to cover all MRP releases and supply must be rationed. By applying the fair share and square sets rules sequentially (i) the fair share quantity of shared resource "Y" is determined to be 50% for each release, i.e., the release of "A" is allotted 50 units and "B" is allotted 100 units, (ii) the square sets analysis determines that the release of "A" is limited to 30 units due to limited availability of component "X" and the release of "B" is limited to 85 units due to limited availability of "Z", and (iii) the constraint on the release of "A" is binding and therefore frees an additional 10 units for release of "B". However, the maximum release of "B" due to availability of "Z" is 85. Thus, only five of the additional units are utilized and the overall releases are 30 units of "A" and 85 units of "B". This example illustrates the fact that each time supply or capacity is allocated it is necessary to constrain the allocation with respect to global bottlenecks, and that such bottlenecks may lead to identification of excess supply that can be reallocated to other releases.

A feature of resource allocation within a production scheduling system which was not illustrated in the above examples is the accommodating of constraints by allocating resources over time. The examples shown in FIGS. 4, 5 and 6 allocated and rationed resources at a particular instance in time. For example, in FIG. 4 insufficient supply was available to support the scheduled material releases. In such cases, supply (or equivalently capacity) must be utilized from a later period. The approach used in this situation is to first determine if sufficient supply and/or capacity are available to support an earlier release. If not, then the remaining portion of the release is delayed until it is feasible to make such a release.

Now understanding the many intricacies of production problems that may arise during the scheduling and manufacturing process, it is now shown the advantages of the present invention. In the actual implementation of the system and method of the present invention within a production scheduling system for semiconductor manufacturing the number of levels of the BOM is on the order of dozens and the number of PNs is measured in hundreds of thousands. The present invention is capable of operating between specific, and strategically chosen, levels of the BOM to allocate and ration supply and capacity within such a complex system.

Having now provided several detailed examples illustrating the underlying concepts of the business rules used within the present invention as well as the general impact of the present invention on the overall production scheduling system, a detailed discussion of the flow of the present invention is now described. It should be recognized that the present invention can be integrated within the PROFIT™ production scheduling software manufactured by International Business Machines, Corp. of Armonk N.Y., but may also be implemented with other production scheduling products. Also, the system and method of the present invention may obtain several inputs, some of which are provided via output from early stages of the production scheduling system and some of which are in the form of user supplied data tables. A detailed list of inputs may include, for example:

- Priority ranked list of material releases indexed by PN, location, process type, and time period.
- Quantity of each component type required per piece of release for each PN indexed by location, process, and time period.
- Component supply available indexed by component PN type, location and time period.
- Transit time to ship each component between each pair of locations indexed by locations.
- Capacity available indexed by capacity type, location and time period.
- Capacity required of each capacity type for each type of material release indexed by location, process and time period.

These inputs are used to compute output in the form of feasible and actual material releases for each PN indexed by location, process and time period. The output also includes shipments of components for each PN for each pair of locations and indexed by time period.

FIG. 7 shows a flowchart of the method of the present invention. FIG. 7 may equally represent a high level block diagram of the system of the present invention. The steps of FIG. 7 (as well as FIG. 8) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Figure 9:
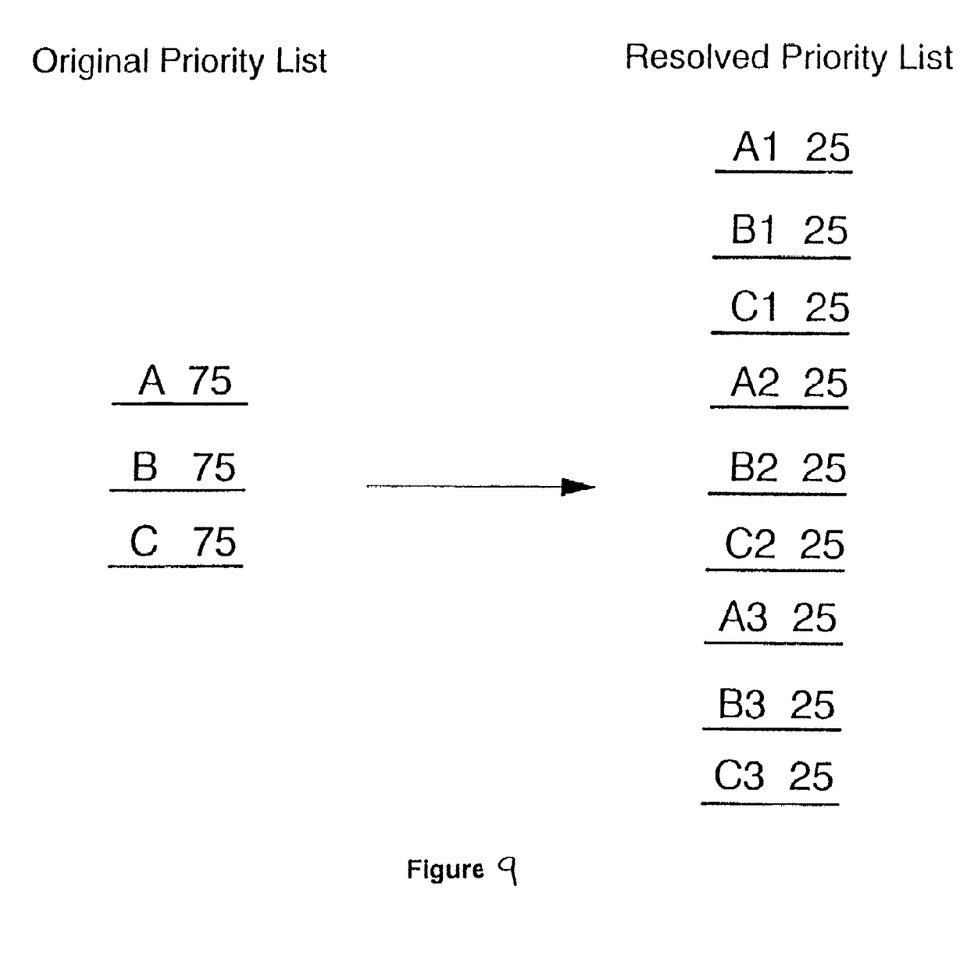
FIG. 9 shows an example of the releases and a priority list generated in step 710 of FIG. 7.

In step 710, a priority ranked list of material releases is resolved to finer granularity and re-sorted. In FIG. 7, the example of a list of these material releases, "A", "B" and "C", with equal priority and N=3 divisions as shown in FIG. 9. It is noted that the degree of resolution depends on the number of divisions "N" of each release, and that the present invention is not limited to three divisions but may be more or less divisions. The sorting is with respect to demand class, release date etc., in addition to sub sorting material releases with the same priority with respect to the "N" divisions. The new priority ranked list of material releases obtained from step 710 is used throughout the remaining steps of FIG. 7.

In step 720, a determination is made as to whether the assembly releases created in step 720 are exhausted. If not, in step 730, the present invention chooses the highest priority release from the list created in step 710. In step 740, the process begins to "loop" through components to determine the supply availability schedule of required component. That is, in step 740, the present invention loops through all of the components for the current release to determine component supply requirements from the BOM and to determine supply availability first in the current period, next in earlier periods, and finally in later periods, if necessary. The supply availability is computed based on its current location and user supplied transit times between locations (from each potential location to the material release location). If sufficient supply is available for the current component in the current time period or earlier then the present invention advances to the next component. Otherwise, if insufficient supply is available then the present invention will proceed to loop through future time periods until sufficient supply is found. The net result of step 740 is to generate a schedule of supply capability for each component required for the material release.

Once a schedule for component supply is known, in step 750, the present invention determines feasibility assignment of component supply and capacity over time. The following steps, as shown in FIG. 8, are carried out at each iteration of step 750 through each time period until the material release has been completely covered:

- Step 810: The component with the least supply available relative to the quantity of the component required in the assembly BOM, i.e., the bottleneck component which limits the size of the release, is found in order to determine the maximum release possible in each time period.
- Step 820*a–c*: Loop through all resource types and time periods allocating capacity over time according to capacity required and subject to availability of the bottleneck (limiting) capacity type until sufficient capacity is allocated according to the limiting component supply. This is done through the following sub steps:
- Step 820*a*: Compute the capacity required for the maximum release for the given time period and resource.
- Step 820*b*: Compute the capacity available for the given time period and resource.
- Step 820*c*: If available capacity for required resource type is greater than required capacity then schedule the maximum release. Otherwise, schedule the largest release possible given the available capacity.
- Step 830: Reduce the remaining release left to schedule by the amount scheduled. (Step 830).

Having determined the schedule of recommended feasible material release in steps 740 and 750, the schedule is appropriately stored in step 760 for later reference/output to the user. That is, in step 760, the present invention adjusts the supply and capacity for later releases and assigns shipments. Thus, based on the recommended material release both the utilized capacity and component supply for future releases is decremented. Furthermore, the schedule of implied recommended component shipments are stored for later output. Finally, control is returned to step 720 to determine if the list of releases is exhausted and, if not, the control flows through steps 730–760 until a feasible schedule of all material releases has been generated for use in the next stage of the BOM. If the release is exhausted in step 720, the flow ends.

FIG. 9 shows an example of the releases "A", "B" and "C" and the priority list generated in step 710 of FIG. 7. In this example, releases "A", "B" and "C" have equal priority. Also and as discussed above, the releases are disaggregated in N=3 divisions. The divisions are then sorted into a resolved priority list. Since all releases "A", "B" and "C" have the same priority, the priority list will read, in order, "A1", "B1", "C1", "A2", "B2", "C2", "A3", "B3" and "C3". Note that there are now three divisions of releases which allow for shorter computation times in determining the optimal scheduling for the manufacturing of item releases in accordance with the present invention. Note also that this division and sorting tends to lead toward fair sharing since, for example, A2 does not obtain a change to consume resources until after B1 and C1 have had their chances.

Now understanding the present invention, it is again worthy to note that the present invention has been implemented with the business rules described herein. For example, the business rules may matches assets with demands such that the material releases of equal priority in each of the "N" separate release schedules are allocated in accordance with the available component supply in proportion to relative size subject to supply and capacity availability. Likewise, the business rule matches assets with demands such that the material releases in each of the "N" separate release schedules are constrained to an optimal size as determined by supply and/or capacity availability of the available component supply.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for providing a supply schedule, comprising the steps of:
   dividing a priority ranked release schedule into "N" separate release schedules, where "N" represents a number of divisions of the priority ranked release schedule;
   sorting the "N" separate release schedules in a priority order based on an original priority ordering of the priority ranked release schedule; and
   allocating available component supply based on the priority in the "N" separate release schedules,
   wherein the allocating step provides a supply schedule of material releases of product by rationing of the available component supply in each of the "N" separate release schedules.

2. The method of claim 1, wherein:
   the "N" separate release schedule groups the releases into smaller groups than the priority ranked release schedule; and
   the priority ranked release schedule is based on at least one requirement for the material releases of an assembly and sequentially computing an implied requirement for the available component supply.

3. The method of claim 1, wherein the dividing step includes dividing the priority ranked release schedule at any level of a supply chain.

4. The method of claim 1, wherein the rationing of the available component supply is further based on business rules.

5. The method of claim 4, wherein the business rules matches assets with requirements such that the material releases of equal priority in each of the "N" separate release schedules are allocated in accordance with the available component supply in proportion to relative size subject to supply and capacity availability.

6. The method of claim 4, wherein the business rule matches assets with requirements such that the material releases in each of the "N" separate release schedules are constrained to a size as determined by limited available component supply.

7. The method of claim 1, wherein:
   the sorting step further modifies the priority ranked release schedule such that priority of the material releases at a particular level in the "N" separate release schedules dynamically allocates and rations limited component supply and capacity among the material releases; and
   the allocation step further allocates finite component supply to the material releases in each of the "N" separate release schedules such that a quantity of each material release is constrained by an availability of the limited component supply.

8. The method of claim 7, wherein a remaining unscheduled portion of the material releases are rescheduled in advance or at a later time period.

9. The method of claim 1, wherein the allocation step further allocates finite capacity to the material releases in each of the "N" separate release schedules such that the material releases are limited to a size and number of possible releases according to limiting capacity resources, wherein the resources include assembly capacity.

10. The method of claim 1, further comprising the step of considering global information for rationing of the available component supply in each of the "N" separate release schedules in order to determine an optimal delay for the scheduled material releases, wherein the global information includes (i) the priority ranked release schedule including a list of the material releases indexed by part number (PN), location, process type and time period, (ii) quantity of each component required per piece of finished assembly for each PN, (iii) supply of the each component being shipped between locations indexed by locations and time period, (iv) transit time to ship the each component between locations indexed by locations, (v) capacity available indexed by capacity type, location and time period, and (vi) capacity required of each capacity type for each type of material release indexed by location, process and time period.

11. A method of optimizing a supply schedule, comprising the steps of:
   dividing each of a priority ranked scheduled release into "N" separate and smaller sized schedule releases, where the priority of each of the "N" schedule releases is equal to a priority of an original release of the priority ranked scheduled release;
   sorting the "N" separate and smaller sized schedule releases based on the original priority ordering and an additional level of priority ordering such that subsequent resource allocation is consistent with rationing of resources; and
   allocating the resources and component supplies to satisfy a scheduled release associated with the "N" separate and smaller sized schedule releases such that the assembly capacities and component supplies are rationed to maximize an output of product in accordance with the priority ranked scheduled release.

12. The method of claim 11, wherein the scheduled release is subject to (i) capacity and component supply constraints not being violated, (ii) a maximum possible release at a next level given the capacity and component supply constraints and (iii) limited resources allocated to equal priority releases in proportion to size.

13. The method of claim 11, wherein the allocating step allocates the assembly capacities and component supplies according to availability determined by user supplied input including transit/shipping times, capacity requirements and capacity availability from current locations.

14. The method of claim 13, wherein the allocating step includes:
attempting to first allocate component supply and capacity resources at a specified release date subject to constraints on the resources and component supplies; and
rationing at least one of the resources and component supplies in proportion to release size if insufficient at least one of the resources and component supplies are available.

15. The method of claim 11, wherein:
the dividing step is applied at predetermined levels of the priority ranked scheduled release;
the allocating step includes determining availability of the component supplies to determine availability first in a current period, next in earlier periods, and then in later periods, wherein the availability is computed based on current location and user supplied transit times between locations.

16. The method of claim 15, wherein:
the component supplies with a least component supply availability is found in order to determine a maximum release of the product in a predetermined time period;
scanning through all capacity types and time periods allocating the assembly capacities over time according to the capacity required and subject to availability until sufficient capacity is allocated according to the component supplies; and
reducing a remaining release of the product left to a new schedule based on the capacity required and subject to component availability.

17. The method of claim 16, wherein the scanning step includes the steps of:
computing the capacity required for a maximum release for the given time period and the resource;
computing the capacity available for the given time period and the resource; and
scheduling the maximum release of product if the available capacity is greater than the required capacity.

18. A system of optimizing a supply schedule, comprising:
means for dividing each of a priority ranked scheduled release into "N" separate and smaller sized schedule releases, where the priority of each of the "N" schedule releases is equal to a priority of an original release of the priority ranked scheduled release;
means for sorting the "N" separate and smaller sized schedule releases based on the original priority ordering and an additional level of priority ordering such that subsequent resource allocation is consistent with rationing of resources; and
means for allocating the resources and component supplies to satisfy a scheduled release associated with the "N" separate and smaller sized schedule releases such that the assembly capacities and component supplies are rationed to maximize an output of product in accordance with the priority ranked scheduled release.

19. The system of claim 18, further comprising means for grouping the "N" separate release schedule into smaller groups than the priority ranked release schedule.

20. The system of claim 18, wherein:
the means for sorting further modifies the priority ranked release schedule such that priority of the material releases at a particular level in the "N" separate release schedules dynamically allocates and rations limited component supply and capacity among the material releases; and
the means for allocating further allocates finite component supply to the material releases in each of the "N" separate release schedules such that a quantity of each material release is constrained by an availability of the limited component supply.

21. The system of claim 18, further comprising means for considering global information for rationing of the available component supply in each of the "N" separate release schedules in order to determine an optimal delay for the scheduled material releases, wherein the global information includes (i) the priority ranked release schedule including a list of the material releases indexed by part number (PN), location, process type and time period, (ii) quantity of each component required per piece of finished assembly for each PN, (iii) supply of the each component being shipped between locations indexed by locations and time period, (iv) transit time to ship the each component between locations indexed by locations, (v) capacity available indexed by capacity type, location and time period, and (vi) capacity required of each capacity type for each type of material release indexed by location, process and time period.

22. A method for optimizing a supply schedule, comprising the steps of:
dividing each of a priority ranked scheduled release into "N" separate and smaller sized schedule releases, where the priority of each of the "N" schedule releases is equal to a priority of an original release of the priority ranked scheduled release;
sorting the "N" separate and smaller sized schedule releases based on the original priority ordering and an additional level of priority ordering such that subsequent resource allocation is consistent with rationing of resources; and
allocating the resources and component supplies to satisfy a scheduled release associated with the "N" separate and smaller sized schedule releases such that the assembly capacities and component supplies are rationed to maximize an output of product in accordance with the priority ranked scheduled release.

23. A machine readable medium containing code for providing a supply schedule, capable of:
dividing a priority ranked release schedule into "N" separate release schedules, where "N" represents a number of divisions of the priority ranked release schedule;
sorting the "N" separate release schedules in a priority order based on an original priority ordering of the priority ranked release schedule; and
allocating available component supply based on the priority in the "N" separate release schedules,
wherein the allocating step provides a supply schedule of material releases of product by rationing of the available component supply in each of the "N" separate release schedules.

* * * * *